United States Patent [19]

Akita et al.

[11] Patent Number: 4,939,755
[45] Date of Patent: Jul. 3, 1990

[54] TIMER/COUNTER USING A REGISTER BLOCK

[75] Inventors: Ikuko Akita; Mineo Akashi, both of Tokyo, Japan

[73] Assignee: NEC Corporation, Tokyo, Japan

[21] Appl. No.: 119,515

[22] Filed: Nov. 12, 1987

[30] Foreign Application Priority Data

Nov. 12, 1986 [JP] Japan ................. 61-270144

[51] Int. Cl.$^5$ ...................... G06F 7/02; H03K 21/38
[52] U.S. Cl. ..................................... 377/39; 364/242; 364/942.7
[58] Field of Search ... 364/200 MS File, 900 MS File; 377/47, 44, 39, 55, 56

[56] References Cited

U.S. PATENT DOCUMENTS

| | | | |
|---|---|---|---|
| 4,090,239 | 5/1978 | Twibell et al. | 364/200 |
| 4,161,787 | 7/1979 | Groves et al. | 364/900 |
| 4,222,103 | 9/1980 | Chamberlin | 364/200 |
| 4,249,070 | 2/1981 | Miller | 377/47 |
| 4,556,938 | 12/1985 | Parker et al. | 364/200 |
| 4,644,462 | 2/1987 | Matsubara et al. | 364/200 |
| 4,879,733 | 11/1989 | Burch et al. | 377/44 |

OTHER PUBLICATIONS

Buchsbaum's Complete Handbook of Practical Electronic Reference Data–Walter H. Buchsbaum, Prentice-Hall, Inc., P-388, 1973.

Primary Examiner—Gareth D. Shaw
Assistant Examiner—Gopal C. Ray
Attorney, Agent, or Firm—Foley & Lardner, Schwartz, Jeffery, Schwaab, Mack, Blumenthal & Evans

[57] ABSTRACT

A timer/counter comprising an operation controller coupled to receive a control information for generating control signals for a selected operation, and a register block coupled to a bus and including a plurality of count registers, a corresponding number of timer registers storing various set values and a buffer circuit controlled by the operation controller to sequentially read data from one of the count registers to the bus and then write the data on the bus to the same count register. An incrementer is coupled to the bus and controlled by the operation controller to increment the data on the bus and to output an incremented data to the bus. A coincidence flag coupled to the register block is set when the incremented data in a count register of the timer block has coincided with a value stored in a corresponding timer register. A clear controller coupled to the coincidence flag clears the count register having the count value in coincidence with the value of the corresponding timer register.

9 Claims, 6 Drawing Sheets

TIMER/COUNTER USING A REGISTER BLOCK

BACKGROUND OF THE INVENTION

1. Field of the Invention

The present invention relates to a timer/counter incorporated in a microcomputer, and more specifically to such a timer/counter which can realize a plurality of timer functions by using a plurality of registers in a software manner.

2. Description of Related Art

Heretofore, a timer/counter is adapted to respond to a clock signal from an internal or external clock source so as to increment the value of count in a counter, and to compare the incremented count value with a predetermined value set in a timer register at each time of increment. Then, the timer/counter will generate an interrupt signal which the incremented count value has become consistent with the predetermined value, and at the same time, clear the counter so that the counter can count from its initial value. Furthermore, the timer/counter can execute a capture operation in which the count value in the counter is transferred and held in the timer register in response to a trigger signal which is generated at a predetermined timing or period.

Thus, if an internal clock generated at a constant period is inputted to the counter, an interrupt signal generated when the count value coincides with the preset value of the timer register will be generated at constant intervals determined by the preset value of the timer register. Therefore, the timer/counter can be used as a timer by setting in the timer register a value corresponding to a desired time interval. Alternatively, if an external signal is inputted to the counter as a clock signal, the count value of the counter will represent the pulse number of the external signal. Therefore, the timer/counter can function as an event counter for counting the number of observed events. Furthermore, if the timer/counter is used to function as a timer and also to cause to the timer register to capture the count value of the counter in response to an external signal as the trigger signal, it is possible to measure the period of occurrence of the external signal, and therefore it is possible to know an operation speed or a position of an external equipment which generates the external signal.

As mentioned above, the timer/counter can realize various functions by selecting a clock signal source and by controlling the comparison operation and/or the capture operation. In addition, the various functions can be executed at a real time in parallel to a program operation of the microcomputer. Therefore, the timer/counter has already held an important position in the field of existing single chip microcomputers.

For example, in printers incorporating therein a microcomputer, timer/counters have been used as (1) an internal timer for stepwise changing a phase of a magnetic field applied to a coil of a step motor for moving a printing head; (2) a position detection counter for determining the position of the printing head, (3) a one-shot timer used to control the application time of an electric current to a printing solenoid, etc. As illustrated by this example, there is recently increased a demand for microcomputers to incorporate therein a large number of timer/counters.

In the prior art, however, the timer/counter is composed of a counter or count register for holding a count value, an incrementer for reading the count value of the counter register so as to increment the count value, and a latch for latching the incremented value from the incrementer and updating the content of the count register by the incremented value. Further, the timer/counter comprises a timer register for storing a predetermined value to be compared with the value of the count register or for capturing the value of the count register, and a comparator for comparing the value of the count register with the preset value of the timer register so as to generate an interrupt signal when both the values coincide with each other. Operations of the above various circuits are controlled by a controller. Then, all of the above mentioned various circuits are constituted of random logic circuits, i.e., hardware.

The random logic circuit needs a large number of transistors, and also, the transistors themselves used for the random logic circuit are of a relatively large size. Therefore, in the case that the random logic circuit is realized on an integrated circuit, a considerably large chip area is required. As a result, if a plurality of timer/counters are formed on a single chip, the chip area must be increased, and so, the cost of the single chip computer would inevitably become high. In addition, the random logic circuit has only a limited function, and therefore, when the numbers of the count registers and the timer registers must be changed, it is necessary to refashion the whole of the circuits, which needs even redesigning of mask patterns used in fabrication of integrated circuits.

SUMMARY OF THE INVENTION

Accordingly, it is an object of the present invention to provide a timer/counter which has overcome at least one of the aforementioned drawbacks.

Another object of the present invention is to provide a timer/counter which can realize a plurality of timer/counter functions with a relatively small amount of hardware.

Still another object of the present invention is to provide a timer/counter having a high feasibility.

A further object of the present invention is to provide a timer/counter realized in a register block by a program operation.

The above and other objects of the present invention are achieved in accordance with the present invention by a timer/counter comprising an operation controller coupled to receive a control information for generating control signals for a selected operation, a register block coupled to a bus and including a plurality of count registers, a corresponding number of timer registers storing various set values and a buffer circuit controlled by the operation controller to sequentially read data from one of the count registers to the bus and then write the data on the bus to the same count register, an incrementer coupled to the bus and controlled by the operation controller to increment the data on the bus and to output an incremented data to the bus, a coincidence flag coupled to the register block and set when the incremented data in a count register of the timer block has coincided with a value stored in a corresponding timer register, and a clear controller coupled to the coincidence flag so as to clear the count register having the count value in coincidence with the value of the corresponding timer register.

With the above mentioned arrangement, a plurality of count registers and timer registers are formed in the register block, i.e., a memory, and count values held in the respective count registers are sequentially read out, and incremented by one incrementer, and then, returned to the same count registers. Accordingly, it is no longer necessary to a plurality of time/counters each composed of a random logic circuit and each including at least one count register, one timer register, an incrementer and a comparator. Therefore, the chip area required for the timer/counter in accordance with the present invention is greatly decreased as compared with the conventional one, and so, a microcomputer incorporating the timer/counter in accordance with the present invention can be inexpensively fabricated on a small area chip.

Furthermore, the count registers and the timer registers in the register block can be constituted of the same memory elements. Therefore, the number of the count registers and the timer registers can be easily changed without needing a substantial change of hardware. Namely, the timer/register in accordance with the present invention can have a high feasibility.

The above and other objects, features and advantages of the present invention will be apparent from the following description of the preferred embodiment of the invention with reference to the accompanying drawings.

DESCRIPTION OF THE PREFERRED EMBODIMENT

Figure 1:
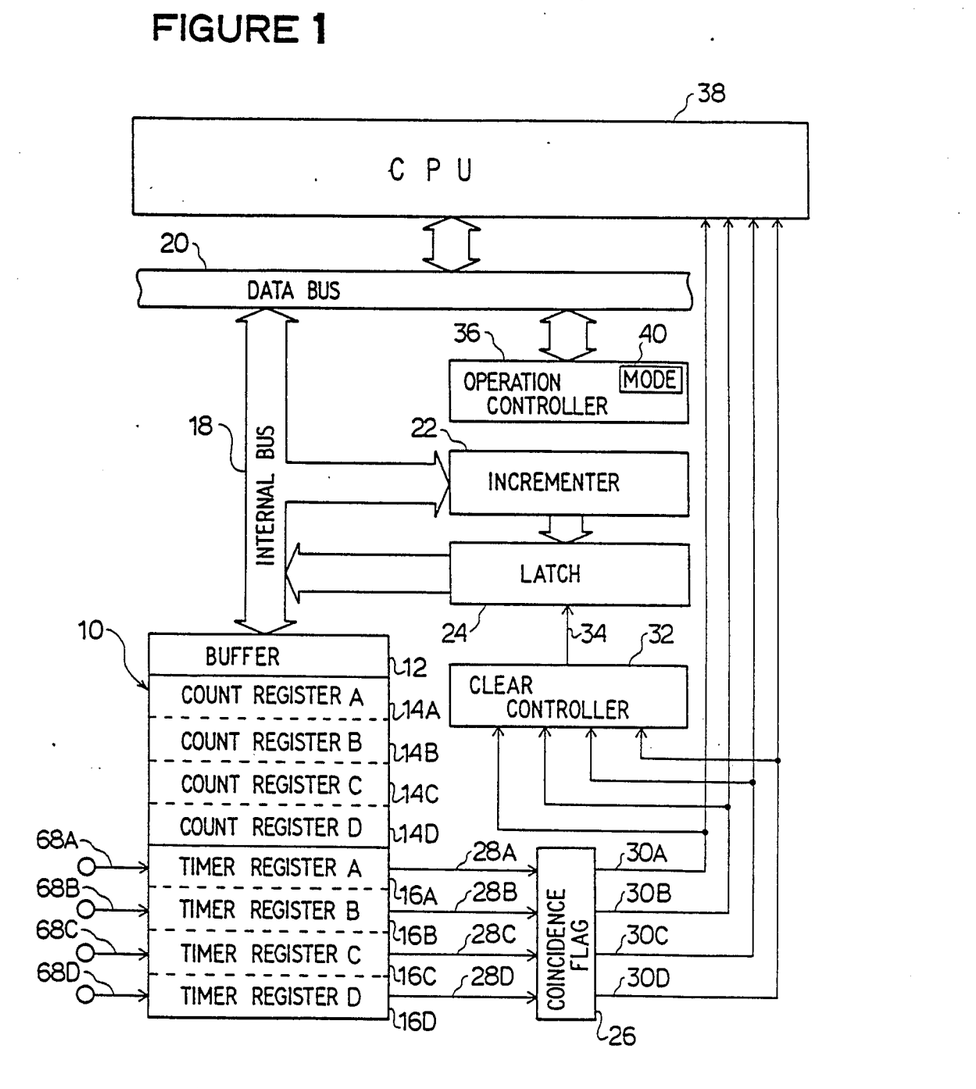
FIG. 1 is a block diagram of one embodiment of the timer/counter in accordance with the present invention.

Referring to FIG. 1, one embodiment of the timer/counter in accordance with the present invention comprises a register block 10 including a plurality of count registers and a corresponding number of timer registers, each of which is constituted of an array of memory cells. In this embodiment, the register block 10 includes a buffer circuit 12 for reading/writing of the memory cells, four count registers 14A, 14B, 14C and 14D each composed of an array of memory cells, and four timer registers 16A, 16B, 16C and 16D each also composed of an array of memory cells. The count registers and the timer registers can be formed of a content addressable memory (called "CAM" hereinafter) or a random access memory. In addition, the count registers 14A to 14D have the same construction and the same function and operate in the same manner, and the timer registers 16A, 16B, 16C and 16D have the same construction and the same function and operate in the same manner.

The register block 10 is coupled through an internal bus 18 to a data bus 20 and an incrementer 22, which operates to receive data on the internal bus 18 and to output an incremented data to a latch 24. This latch 24 outputs the latched data to the internal bus 18 so that the data will be written into a register of the register block 10.

A coincidence flag 26 is coupled to receive coincidence signals 28A, 28B, 28C and 28D from the respective time registers 16A, 16B, 16C and 16D and to correspondingly output interrupt signals 30A, 30B, 30C and 30D to a clear controller 32. This clear controller 32 generates a clear signal 34 to the latch 24 in response to the received interrupt signal.

The shown time/counter also includes an operation controller 36 coupled to the data bus 20 to receive a control information from a central processing unit (called "CPU" hereinafter) 38. This operation controller 36 includes therein a mode register 40 designating an operation mode of the timer/counter, and controls the operation mode and the operation timing of various circuits in the timer/counter. Further, the CPU 38 receives the interrupt signals 30A to 30D.

Figure 2:
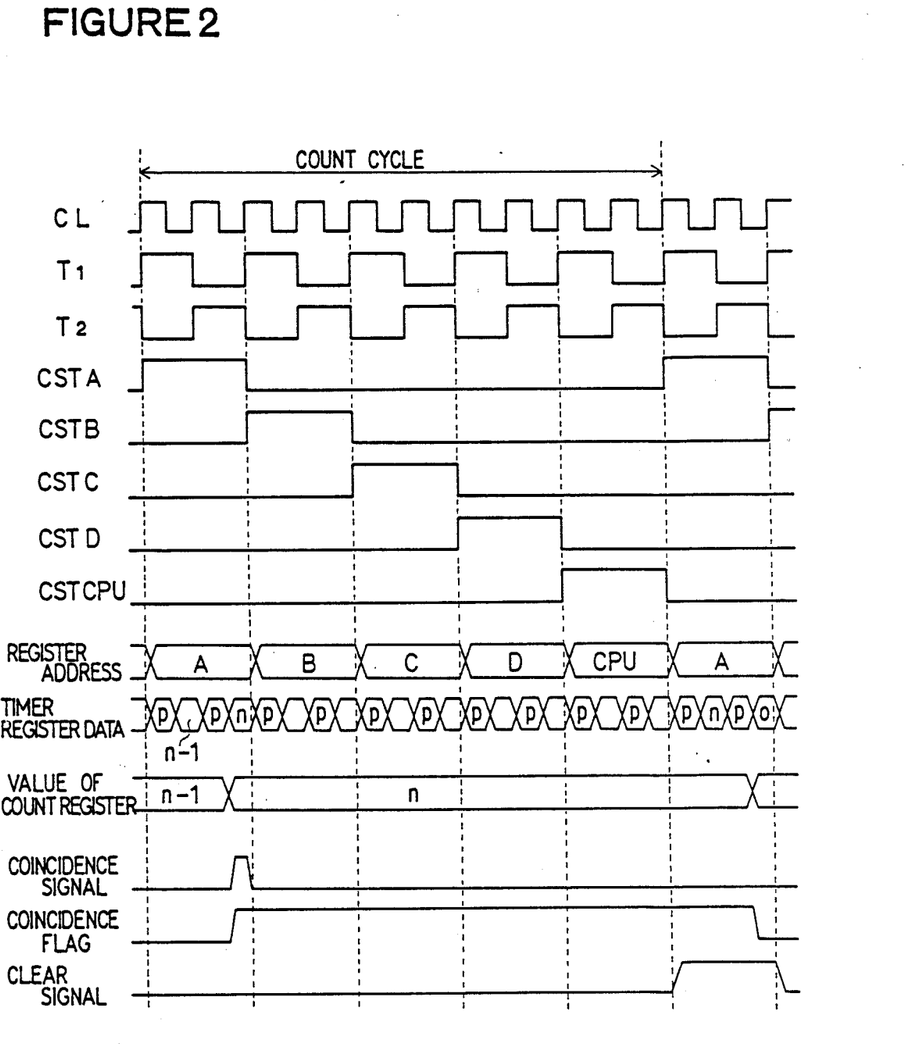
FIG. 2 is a time chart illustrating a comparison operation of the timer/counter shown in FIG. 1.

Now, operation will be explained on the timer/counter as mentioned above with reference to the time chart shown in FIG. 2. As explained hereinbefore, however, since the count registers 14A to 14D and the timer registers 16A to 16D are the same, respectively, explanation will be limited to the count register 14A and the timer register 16A.

In the case that the time/counter operates as a timer, a count number and control information are transferred through the data bus 20 in accordance with a program operation executed by the CPU 38, and then stored in the timer register 16A of the register block 10 and the operation controller 36. At this time, the mode register 40 of the operation controller 36 is set to a comparison operation, and it is assumed that a comparison value "n" is set in the timer register 16A. Thus, on the basis of the received control information the operation controller 36 will generate operation control signals to various circuits and select an input clock signal (from internal clock sources or external clock sources).

The count operations of the respective registers are sequentially executed by using the incrementer 22, the internal bus 18, etc. in a time division manner in synchronism with a reference clock signal CL. Specifically, as can be seen from FIG. 2, one unitary count-up operation of each count register is executed for a time period corresponding to two reference clocks (this period will be called "count stage" hereinafter). Therefore, a sequence of count operations of the four count registers 14A to 14D and an access operation of the CPU 38 are carried out for five count stages (i.e., for the time of ten reference clocks), which constitute one count cycle. In order to sequentially execute the above five operations, five count stages signals CSTA, CSTB, CSTC, CSTD and CSTCPU are generated from the reference clock. These count stage signals CST are sequentially made active for one count stage without overlapping with each other, as shown in FIG. 2, and are respectively assigned to the count registers 14A to 14D and the CPU 38. Therefore, if the CSTA signal is active, i.e., at a high level, the count operation is executed for the count register 14A.

Furthermore, the reference clock CL is frequency-divided to generate a first timing signal T1 indicative of a first half of each count stage and a second timing signal T2 indicative of a second half of each count stage. The operation of the various circuit is timed on the basis of the reference clock CL and the two timing signals T1 and T2.

Namely, when the reference clock CL is at a high level in the high level period of the timing signal T1, an internal data line of the register block is precharged. This precharging period is shown by "P" in FIG. 2. Thereafter, when the clock CL becomes at a low level in the high level period of the same timing signal T1, the content of the count register 14A is read out and fed through the internal bus 18 to the incrementer 22 and the output of the incrementer 22 is latched in the latch 24. At this time, if a count clock (not shown) previously designated by the operation controller 36 in correspondence to the count register 14A is active, the incrementer 22 increments the inputted data. But, if not so, the incrementer 22 outputs the inputted data as it is without increment.

Now, assuming that the content of the count register 14A already is "n-1" and the count clock is active, the data "n-1" is read out from the count register 14A, and incremented to "n" by the incrementer 22 in the period of the timing signal T1. The incremented data "n" is latched in the latch 24 in the period of the same timing signal T1.

In a high level period of the timing signal T2 succeeding to the high level timing signal T1, the content of the latch 24 is outputted to the internal bus 18, and on the other hand, the internal data lines of the count register 14A are precharged at the high level time of the clock CL during the high level period of the timing signal T2, and then, the count register 14A is rewritten with the data on the internal bus 18, i.e., the incremented data "n" in the above example at a low level time of the clock CL during the high level period of the same timing signal T2. At the same time, the data on the internal bus 18 is compared with the content previously set in the corresponding timer register 16A, and if they are coincident with each other, the timer register 16A generates an active or high level coincidence signal 28A, which will set the coincidence flag 26. As a result, the coincidence flag 26 generates a high level interrupt signal 30A to the clear controller 32 and the CPU 38.

In the corresponding count stage of the next count cycle, the clear controller 32 generates a clear signal 34 to the latch 24. As a result, although the content of the count register 14A is read out to the incrementer 22 at the timing signal T1 so as to cause it to output an incremented or unincremented data, since the latch 24 outputs data of "0" to the internal bus in accordance with the clear signal 34 regardless of the output of the incrementer 22, the data of "0" is written to the count register 14A. In other words, the count register 14A is cleared. At the same time, the coincidence flag 26 is reset, and the clear signal 34 is returned to a low level at the completion of the count stage.

The CPU 38 can access the timer registers 16A to 16D in the period of the count stage CSTCPU assigned to the access operation of the CPU 38. Specifically, at a high level time of the reference clock CL during the high level period of the timing signal T1, the bus 20 is precharged and the CPU 38 transfers the register designation information fed through the bus 20 to the register block 10 as an address information, and at the succeeding low level period of the same clock CL, it causes the register block 10 to output the content at the designated address to the bus 20. In the writing, data is written to the register block through the data bus 20 at the low level period of the reference clock CL.

Figure 3:
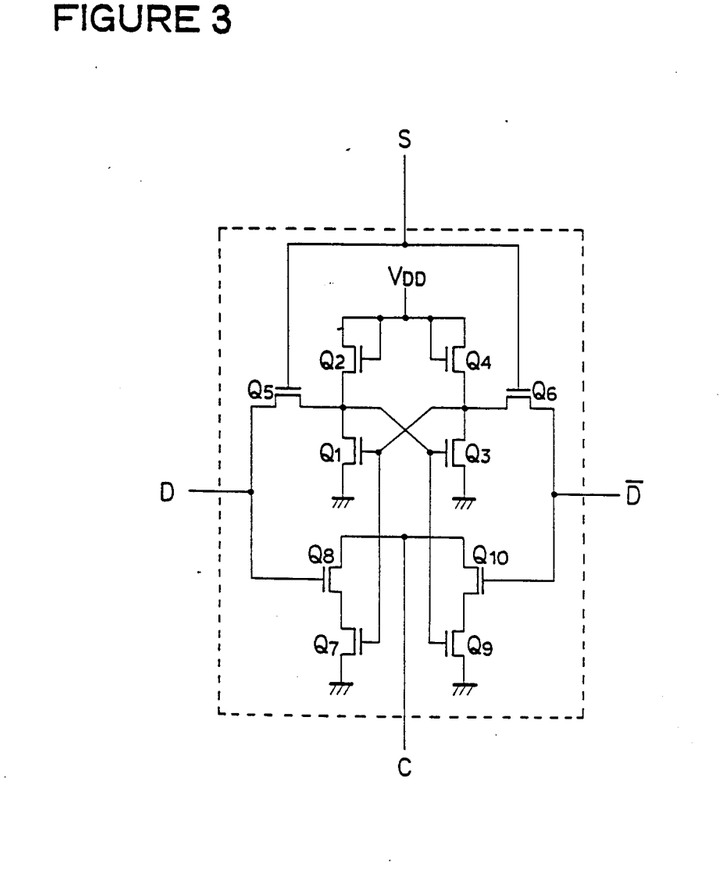
FIG. 3 is a circuit diagram of a fundamental cell used in a content addressable memory which can be used in the register block for the timer/counter shown in FIG. 1.

As mentioned hereinbefore, the registers of the register block 10 are formed of an array of CAM cells. Referring to FIG. 3, there is shown a circuit diagram of one CAM cell. The shown CAM cell includes ten transistors $Q_1$ to $Q_{10}$ connected as shown in FIG. 3, and has a pair of input/output lines D and $\overline{D}$ for a truth value and an inversion value, a cell selection signal line S and a data discrimination output line C. Transistors $Q_1$ and $Q_3$ are cross-connected to each other as shown to form a flipflop which can be inverted in response to an inputted data, and connected through respective load transistors $Q_2$ and $Q_4$ between a voltage $V_{DD}$ and the ground. A node between $Q_1$ and $Q_2$ and another node between $Q_3$ and $Q_4$ are respectively connected to the pair of data input/output lines D and $\overline{D}$ through transistors $Q_5$ and $Q_6$ whose gates are commonly connected to the selection signal line S.

The flipflop thus formed stores a bit of information by its internal condition. In the case of reading data from the CAM cell, the cell selection line S is rendered active so as to put the transistors $Q_5$ and $Q_6$ in a conductive condition, with the result that the data held in the flipflop is read out to the pair of input/output lines D and $\overline{D}$. On the other hand, in the case of writing data to the flipflop, the truth value and the inversion value of data to be written are supplied to the pair of input/output lines D and $\overline{D}$, respectively, and the cell selection line S is made active so as to bring the transistors $Q_5$ and $Q_6$ into a conductive condition. As a result, the internal condition is forcibly changed to conform with the inputted data. For example, in case of writing a logic value "1", the node between the transistors $Q_1$ and $Q_2$ is brought to a high level and the node between the transistors $Q_3$ and $Q_4$ is brought to a low level. On the other hand, in case of writing a logic value of "0", the node between $Q_1$ and $Q_2$ is brought to a low level and the node between $Q_3$ and $Q_4$ is brough to a high level.

A circuit for discriminating coincidence between the input data and the stored data includes four transistors $Q_7$, $Q_8$, $Q_9$ and $Q_{10}$. A pair of transistors $Q_7$ and $Q_8$ are connected in series between the data discrimination output line C and the ground, and connected at their gates to the truth value input/output line D and the node between the transistors $Q_3$ and $Q_4$, respectively. Another pair of transistors $Q_9$ and $Q_{10}$ are connected in series between the data discrimination output line C and the ground, and connected at their gates the inversion value input/output line $\overline{D}$ and the node between the transistor $Q_1$ and $Q_2$.

This discrimination circuit generates the coincidence signal in response to the inputted data and the stored data, as described in the following Table.

TABLE

| D | $\overline{D}$ | STORED VALUE OF F. F. | STATUS OF TRANSISTORS | | | | COINCIDENCE SIGNAL C |
|---|---|---|---|---|---|---|---|
| | | | $Q_7$ | $Q_8$ | $Q_9$ | $Q_{10}$ | |
| 0 | 0 | 0 | ON | OFF | OFF | OFF | 1 (non-conductive) |
| 0 | 0 | 1 | OFF | OFF | ON | OFF | 1 (non-conductive) |
| 0 | 1 | 0 | ON | OFF | OFF | ON | 1 (non-conductive) |
| 0 | 1 | 1 | OFF | OFF | ON | ON | 0 (ground level) |
| 1 | 0 | 0 | ON | ON | OFF | OFF | 0 (ground level |
| 1 | 0 | 1 | OFF | ON | ON | OFF | 1 (non-conductive) |
| 1 | 1 | 0 | ON | ON | OFF | ON | 0 (ground level |
| 1 | 1 | 1 | OFF | ON | ON | ON | 0 (ground |

TABLE-continued

| | | STORED VALUE OF F. F. | STATUS OF TRANSISTORS | | | | COINCIDENCE SIGNAL |
|---|---|---|---|---|---|---|---|
| D | D̄ | F. F. | Q7 | Q8 | Q9 | Q10 | C |
| | | | | | | | level) |

The above Table is based on the assumption that a condition in which the line C is at ground level represents a logic value "0," and another condition in which the line C is isolated from the ground indicates a logic value "1".

As seen from the circuit structure of the discrimination circuit shown in FIG. 3, the circuit generates at the line C and exclusive OR signal representative of incoincidence between the input data on the input/output lines D and D̄ and the stored data held in the flipflop. Specifically, the discrimination circuit generates the logic value "1" on the line C not only when the input data is perfectly coincident with the stored data both in the truth value and in the inversion value, but also when both of the input data D and D̄ are at a logic "0" regardless of the stored data. In the latter case, the result of the comparison is masked. On the other hand, the discrimination circuit generates the logic value "0" on the line C not only when the input data is completely different from the stored data both in the truth value and in the inversion value, but also both of the input data D and D̄ are at a logic level "1". Namely, in the latter case, the discrimination result of the incoincidence is generated unconditionally.

Figure 4:
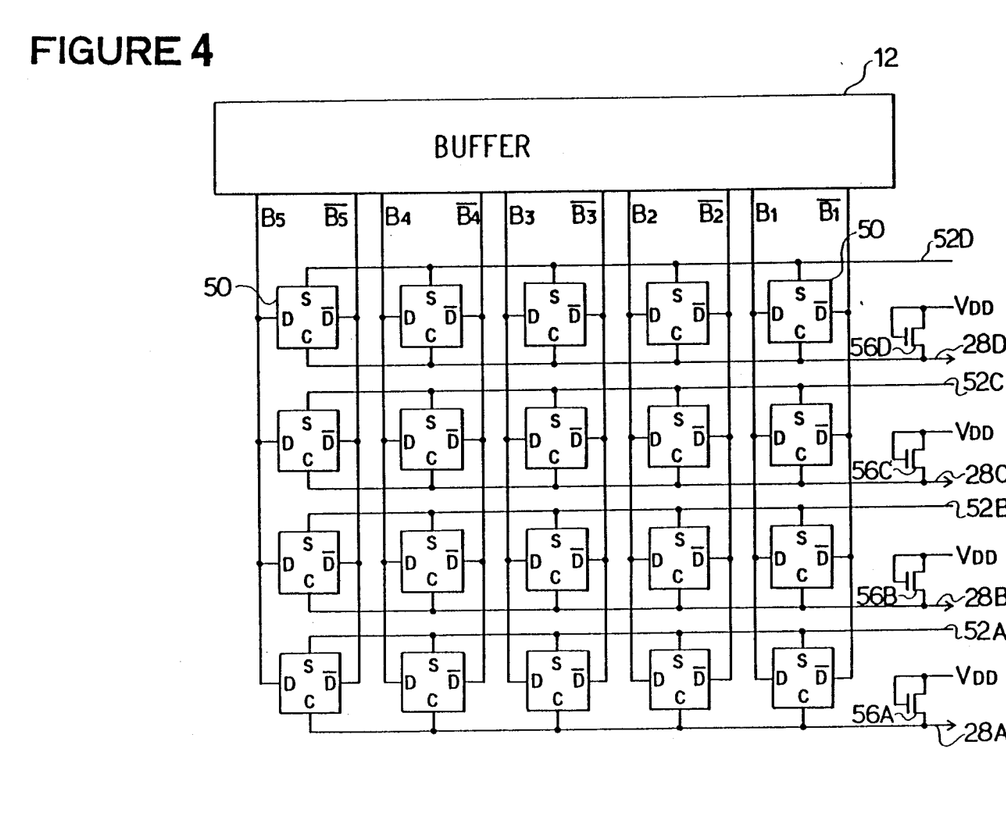
FIG. 4 is a block diagram of the timer register constituted by using the fundamental cells shown in FIG. 3.

Referring to FIG. 4, there is shown a block diagram of the timer registers 16A to 16D, each of which is composed of an array of five CAM cells 50 shown in FIG. 3. As seen from FIG. 4, CAM cells 50 of the respective cell arrays positioned at the same bit place are connected in parallel at their respective inputs/outputs D and D̄ so as to receive the same place bit data (B1 and B̄1, B2 and B̄2, B3 and B̄3, B4 and B̄4 or B5 and B̄5) from the buffer circuit 12. On the other hand, the selection inputs S and the discrimination outputs C of the respective CAM cells 50 included in the same array are respectively connected commonly to a selection signal line 52 (52A, 52B, 52C or 52D) and the coincidence signal line 28 (28A, 28B, 28C or 28D) which is pulled up to V_DD through a load transistor 56 (56A, 56B, 56C or 56D). Therefore, when all the discrimination signals C of the CAM cells in the same array are at the logic value "1" (i.e., isolated from the ground), the coincidence signal line 28 will generate a high level signal of the logic value "1". But, if any one of the CAM cells in the same array generates the logic value "0" as the discrimination signal C (i.e., shortcircuited to the ground), the coincidence signal line 28 is brought to a low level of the logic value "0".

Figure 5:
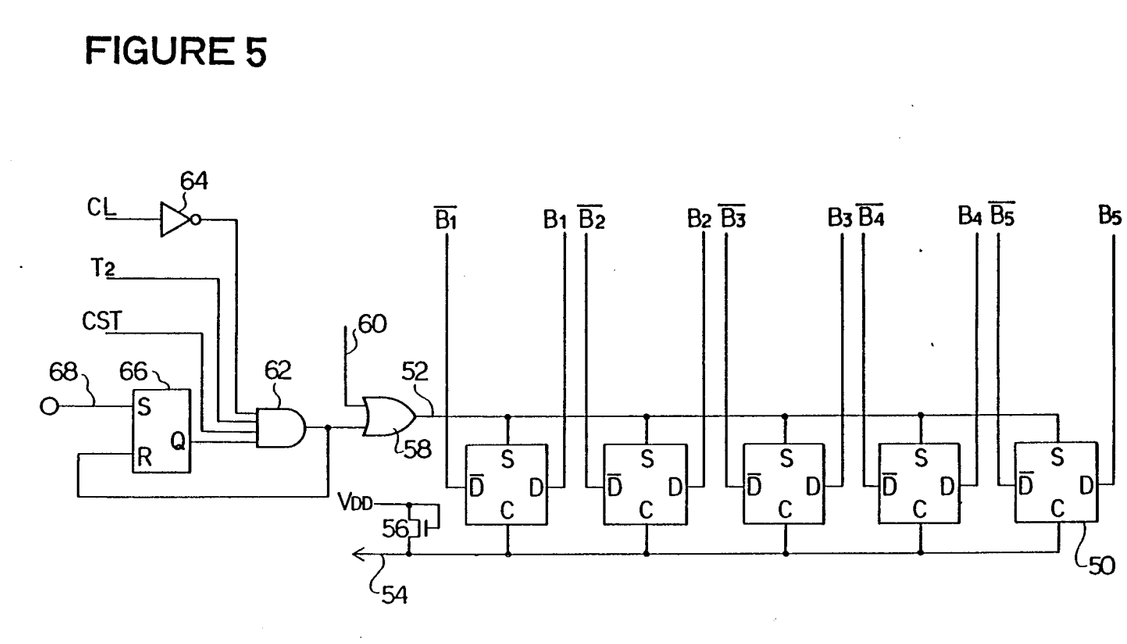
FIG. 5 is a block diagram of the timer register having a capture function.

Turning to FIG. 5, there is shown an array of CAM cells which can be used as the count timer and also as the timer register. The shown five CAM cells 50 are connected in a manner similar to that shown in FIG. 4. To the selection signal line 52 is connected an output of an OR gate 58 which is connected to receive at its one input a selection address decoder output signal 60 and at its other input an output of an AND gate 62. The signal 60 is applied when the CPU 38 accesses the register block, for example, to set a comparison value to the timer register. The AND gate 62 receives at its first input the reference clock CL through an inverter 64, at its second input the timing signal T2, at its third input the count stage signal CST, and at its fourth input a Q output of a capture flipflops 66 of the set/reset type. This flipflop has a set input connected to receive a capture trigger signal, and a reset input connected to the output of the AND gate 62.

Figure 6:
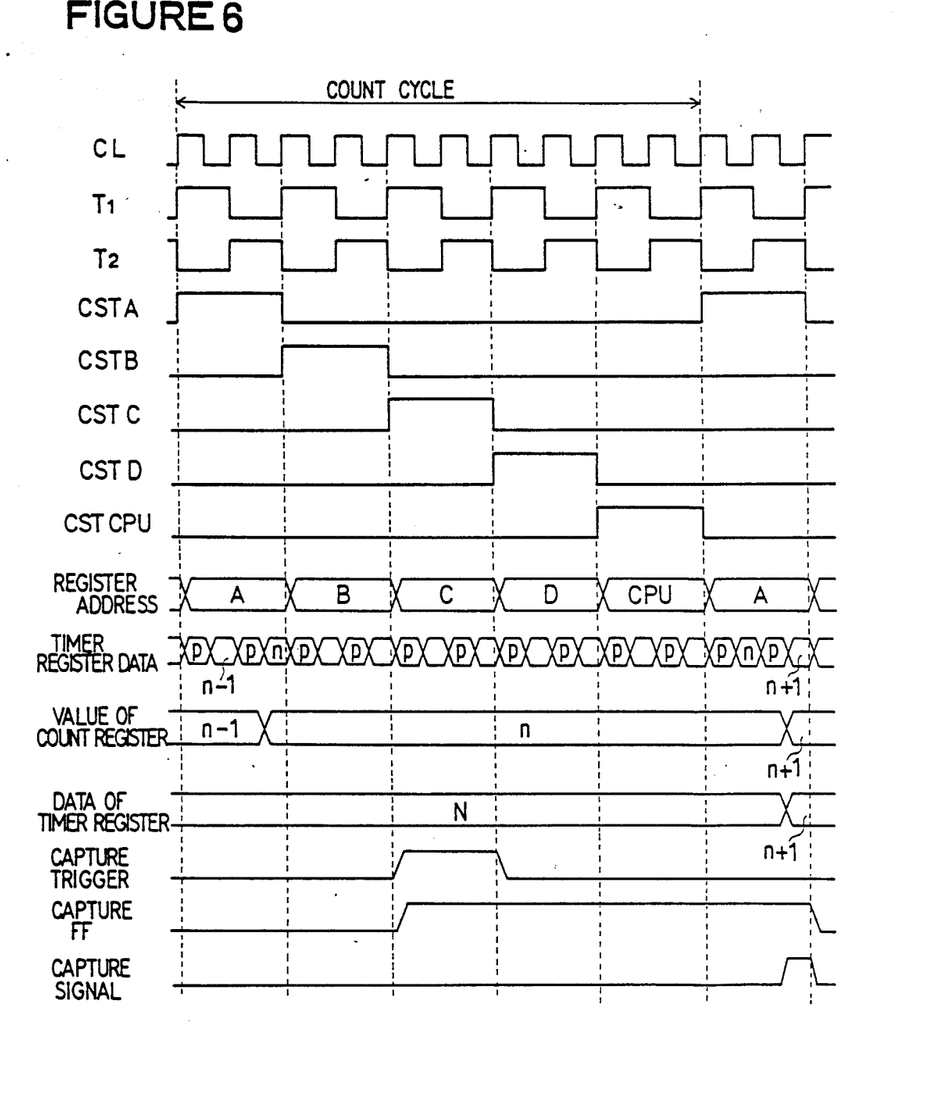
FIG. 6 is a time chart illustrating the capture operation.

Next, the capture operation will be explained with reference to FIG. 5 and a timing chart shown in FIG. 6. In this case, the mode register 40 is set to the capture operation, and data "n" is set to the timer register 16A. As seen from FIG. 6, in the capture operation, the selection of the count registers in correspondence to the count stage and the increment operation are executed similarly to the comparison operation. If a capture trigger signal 68 is generated (in this embodiment, at a second count stage after the count stage in which the designated count register 16A is incremented to "n"), the capture flipflop 66 is set, so that the Q output is brought to a high level. This condition is maintained after the next corresponding count stage is executed. When the corresponding count stage is executed, since the CST signal (CSTA) is maintained at a high level, the AND gate 62 generates the capture signal at the moment the reference clock CL is brought from a high level to a low level in the high level period of the timing signal T2. At the same time, the capture flipflop 66 is reset.

The capture signal is applied from the AND gate 62 through the OR gate 58 and the line 52 to the selection signal lines S of the respective CAM cells. At this time, the count value is outputted from the latch 24 to the data lines D and D̄ in the register block 10, and then is written to the selected count register 14A and also to the selected timer register 16A. With the operation, the value (n+1) of the count register 14A which has been rewritten at the corresponding count stage just after the capture trigger 68 is generated, is also stored to the corresponding timer register 16A.

As seen from the above explanation, a plurality of counters can be realized in the timer/counter which can be constructed with a relatively small number of transistors, because it is not necessary to prepare one incrementer, one comparator, etc. in the form of logic circuits for each of counters. Therefore, the timer/counter can be realized in a small area chip at an inexpensive cost. Further, the count registers and the timer registers are prepared in the register block, i.e., in a memory, and the count registers are sequentially incremented in a programmed operation. Therefore, the number of these registers can be freely changed. Particularly, each timer register is formed of an array of CAM cells having a coincidence detection function, and so, there is required no comparator composed of a random logic. In addition, the array of CAM cells can be used as the count register. Accordingly, the timer/counter has a good feasibility.

The invention has thus been shown and described with reference to the specific embodiment. However, it should be noted that the invention is in no way limited to the details of the illustrated structures but changes and modifications may be made within the scope of the appended claims.

We claim:

1. A timer/counter comprising:
   an operation controller coupled to receive control information for generating control signals for a selected operation;

a register block coupled to a bus and including a plurality of count registers, a corresponding number of timer registers storing various set values, and a read/write buffer circuit controlled by said operation controller to sequentially read data from said count registers onto said bus, one count register at a time, and then write data from said bus into the same count register before data is read from a next count register;

an incrementer coupled to said bus to function commonly for all said count registers of said register block, said incrementer being controlled by said operation controller to increment data from said bus and to return incremented data to said bus, such that said count registers are sequentially read out one by one to output data held in a respective count register onto said bus so as to cause data outputted onto said bus to be incremented by said incrementer, and incremented data to be returned onto said bus, whereby a count register from which data has been read out is written with incremented data, with a result that said count registers are sequentially incremented by said incrementer one by one;

a coincidence flag coupled to said register block and set when incremented data in a count register of said register block has coincided with a value stored in a corresponding timer register; and a clear controller coupled to said coincidence flag so as to clear a count register having a count value in coincidence with said value stored in said corresponding timer register.

2. A timer/counter claimed in claim 1 further comprising a latch provided commonly to all said count registers of said register block for latching an output of said incrementer at each time data is read out of any one of said count registers onto said bus and is incremented by said incrementer, so as to output latched data through said bus to said register block.

3. A timer/counter claimed in claim 1, wherein said register block and said incrementer are controlled by a train of count clocks, each pair of continuous count clocks of which define one count stage, so as to sequentially and cyclicly execute on respective count registers such a count operation that data of one count register is read out to said incrementer under a control of said buffer circuit in response to a first count clock of one count stage assigned to one count register, and read-out data is incremented in response to a second count clock of the same count stage, and then incremented data is written into the same count register, whereby all said count registers of said register block are incremented by one during continuous count stages of the same number as that of said count registers.

4. A timer/counter claimed in claim 3 wherein each of said timer registers executes an coincidence detection between the set value and the content of a corresponding count register each time said corresponding count register is rewritten with incremented data from said incrementer.

5. A timer/counter claimed in claim 4, wherein each said timer register comprises a plurality of content addressable memory cells arranged to form one row so that one matrix is formed by said memory cells of all said timer registers, each of said memory cells having at least one selection terminal and one data input/output terminal, said selection terminals of all said memory cells belonging to same and one row of said matrix corresponding to one count register being connected commonly to a selection input for the same count register, and the data input/output terminals of all said memory cells belonging to same and one column of said matrix being connected commonly to one corresponding bit of a data input/output of said buffer circuit.

6. A timer/counter claimed in claim 5, wherein said data input/output terminal of each said memory cell comprises a truth data signal input/output and an inversion data signal input/output, and wherein each of said memory cells includes a flipflop having first and second data inputs/outputs receiving a pair of data signals in an inverse phase to each other, a pair of switching transistors respectively connected between said first input/output of said flipflop and said truth data signal input/output of said memory cell and between said second input/output of said flipflop and said inversion data signal input/output of the same memory cell, said switching transistors being connected to receive at their control electrodes the same selection signal, and a pair of two-input exclusive OR circuits connected at their respective outputs commonly to a coincidence detection output, one of said exclusive OR circuits being connected at one input to said truth data signal input/output and at another input to said second input/output of said flipflop, and the other exclusive OR circuit being connected at said one input to said inversion data signal input/output and at another input to said first input/output of said flipflop, so that when a selection signal is active, data can be read from and written into said flipflop, and when a selection signal is inactive, said exclusive OR circuits generate at said coincidence detection output a signal indicative of whether or not input data is the same as data set in said flipflop.

7. A timer/counter claimed in claim 1 wherein said register block operates in response to a capture signal so that incremented data is written not only into one of said count registers but also into a corresponding timer register.

8. A timer/counter comprising:
a register block coupled to a bus and including a plurality of count registers for holding data, and a read/write circuit coupled to said count registers for sequentially reading said data out from said registers one by one in order to output said data held in said count registers onto said bus and for writing data on said bus into the same count register from which data is read out before data is read from a next count register, an incrementer coupled to said bus to function commonly for all of said count registers of said register block, for incrementing data on said bus and returning incremented data to said bus, and means for sequentially generating count stage signals of a same number as that of said count registers in each count cycle, wherein said count stage signals generated in each count cycle being assigned to said count registers, respectively, so that there is sequentially executed on said respective count registers such a count operation so that data of one count register is read out to said incrementer during a first half of one count stage signal assigned to said one count register, and read-out data is incremented during a second half of the same count stage signal, and then incremented data is written into the same count register, whereby all said count registers of said register block are incremented by one during continuous count stage signals of said same number as that of said count registers.

9. A timer/counter comprising:

a register block coupled to a bus and including a plurality of count registers, a corresponding number of timer registers for storing various set values, and a read/write circuit coupled to said count registers for sequentially reading said data out from said registers one by one in order to output said data held in said count registers onto said bus, and for writing data on said bus into the same count register from which data is read out before data is read from a next count register, an incrementer coupled to said bus to function commonly for all of said count registers of said register block, for incrementing data on said bus and outputting incremented data to said bus, and means for sequentially generating count stage signals of a same number as that of said count registers in each count cycle, wherein said count stage signals generated in each count cycle being assigned to said count registers, respectively, so that there is sequentially executed on respective count registers and corresponding timer registers such a count operation that data of one count register is read out to said incrementer during a first half of one count stage signal assigned to said one count register, and read out data is incremented during a second half of the same count stage signal, and then incremented data is written into the same count register, and is compared with a set value in a corresponding timer register, whereby all said count registers of said register block are incremented by one during continuous count stage signals of the same number as that of said count registers.

* * * * *